United States Patent
Peinado et al.

(10) Patent No.: US 7,249,105 B1
(45) Date of Patent: Jul. 24, 2007

(54) BORE-RESISTANT DIGITAL GOODS CONFIGURATION AND DISTRIBUTION METHODS AND ARRANGEMENTS

(75) Inventors: Marcus Peinado, Bellevue, WA (US); Mariusz H. Jakubowski, Bellevue, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/525,206

(22) Filed: Mar. 14, 2000

(51) Int. Cl.
*G06F 99/00* (2006.01)
*H04F 1/00* (2006.01)

(52) U.S. Cl. .................... 705/56; 705/50; 705/51; 705/52; 713/190; 713/194; 717/51

(58) Field of Classification Search .......... 705/56, 705/55, 51, 201, 50, 52; 713/201, 190, 194; 380/42, 63; 717/108
See application file for complete search history.

(56) References Cited

U.S. PATENT DOCUMENTS

| | | | | |
|---|---|---|---|---|
| 4,835,682 | A * | 5/1989 | Kurachi et al. | 705/56 |
| 5,222,133 | A * | 6/1993 | Chou et al. | 705/55 |
| 5,497,479 | A * | 3/1996 | Hornbuckle | 463/29 |
| 5,559,884 | A | 9/1996 | Davidson et al. | 380/4 |
| 5,666,411 | A | 9/1997 | McCarty | |
| 5,861,761 | A * | 1/1999 | Kean | 326/41 |
| 5,892,899 | A | 4/1999 | Aucsmith et al. | 395/186 |
| 6,169,805 | B1 * | 1/2001 | Dunn et al. | 380/259 |
| 6,223,288 | B1 * | 4/2001 | Byrne | 713/190 |
| 6,230,318 | B1 * | 5/2001 | Halstead et al. | 717/108 |
| 6,237,096 | B1 * | 5/2001 | Bisbee et al. | 705/51 |
| 6,249,866 | B1 * | 6/2001 | Brundrett et al. | 713/201 |
| 6,260,141 | B1 * | 7/2001 | Park | 713/155 |
| 6,343,280 | B2 * | 1/2002 | Clark | 705/55 |

(Continued)

FOREIGN PATENT DOCUMENTS

EP    0105241 A2 * 11/1984

(Continued)

OTHER PUBLICATIONS

Frederick B. Cohen, "Operatiing system protection through program evolution", *Computers & Security*, vol. 12, No. 6, Elsevier Science Publishers Ltd., Oct. 1993, pp. 565-584.

*Primary Examiner*—Firmin Backer
(74) *Attorney, Agent, or Firm*—Lee & Hayes, PLLC

(57) ABSTRACT

Break-Once, Run-everywhere (BORE) resistant software configurations and digital goods and content distribution methods and arrangements are provided for use in computer systems and networks. An initial digital good is selectively divided into at least two portions. The first portion is provided to a destination computer, for example, via a CD ROM, floppy disk, or pre-loaded on a hard disk drive. The second portion is operatively modified within a source computer based on unique data associated with the destination computer. The modified second portion is then provided to the destination computer, for example, over a network, along with a key that can be used to operatively modify the first portion to be compatible with the modified second portion. The destination computer then modifies the first portion accordingly, and combines the modified first portion with the modified second portion to produce a modified digital good that is operatively different in configuration, but substantially functionally equivalent to the initial digital good. During subsequent initialization or operation, the modified digital good verifies that the destination computer is properly associated with the key and/or the unique data previously associated with the destination computer.

66 Claims, 8 Drawing Sheets

U.S. PATENT DOCUMENTS

| | | | |
|---|---|---|---|
| 6,347,846 B1 * | 2/2002 | Nakamura | 380/203 |
| 6,598,166 B1 * | 7/2003 | Folmsbee | 713/190 |
| 6,691,281 B1 * | 2/2004 | Sorge et al. | 715/503 |
| 6,715,079 B1 * | 3/2004 | Maytal et al. | 713/194 |
| 2002/0123967 A1 * | 9/2002 | Wang | 705/51 |

FOREIGN PATENT DOCUMENTS

| | | |
|---|---|---|
| WO | WO 98/42098 | 9/1998 |
| WO | WO98/45768 | 10/1998 |

* cited by examiner

BORE-RESISTANT DIGITAL GOODS CONFIGURATION AND DISTRIBUTION METHODS AND ARRANGEMENTS

TECHNICAL FIELD

This invention relates to digital goods and content, and more particularly to Break-Once, Run-Everywhere (BORE) resistant digital goods configuration and distribution methods and arrangements that significantly protect rights associated with the distribution and use of digital goods and digital content.

BACKGROUND

Digital goods (e.g., software products and the like) and data or digital content (e.g., music, video, books, etc.) are often distributed to consumers via fixed computer readable media, such as, for example, a compact disc (CD-ROM), digital versatile disc (DVD-ROM), soft magnetic diskette, or hard magnetic disk (e.g., a preloaded hard drive). More recently, consumers have been able to download digital goods and digital content directly to their computers using data communication services, such as, for example, those associated with the Internet.

One of the on-going concerns with such distribution techniques, however, is the need to provide digital rights management (DRM) protection to prevent unauthorized distribution, copying and/or illegal operation of, or access to the digital good and content. An ideal digital goods distribution system would substantially prevent unauthorized distribution/use of the digital goods and content.

Various DRM techniques have been developed and employed in an attempt to thwart potential software pirates from illegally copying or otherwise distributing the digital goods to others. For example, one DRM technique includes requiring the consumer to insert the original CD-ROM or DVD-ROM for verification prior to enabling the operation of a related copy of the digital good. Unfortunately, this DRM technique typically places an unwelcome burden on the honest consumer, especially those concerned with speed and productivity. Moreover, such techniques are impracticable for digital goods that are site licensed, such as, for example, software products that are licensed for use by several computers, and/or for digital goods that are downloaded directly to a computer. Additionally, it is not overly difficult for unscrupulous individuals/organizations to produce working pirated copies of the CD-ROM, for example.

Another DRM technique includes requiring or otherwise encouraging the consumer to register the digital good with the provider, for example, either through the mail or online via the Internet or a direct connection. Thus, the digital good may require the consumer to enter a registration code before allowing the digital good to be fully operational or the digital content to be fully accessed. Unfortunately, such DRM techniques are not always effective since unscrupulous individuals/organizations need only break through or otherwise undermine the DRM protections in a single copy of the digital good. Once broken, copies of the digital good can be illegally distributed, hence such DRM techniques are considered to be Break-Once, Run-Everywhere (BORE) susceptible.

Consequently, there is need for digital goods configuration and/or distribution methods and arrangements that are significantly more BORE-resistant. Preferably, the BORE-resistant methods and arrangements will be easy to implement and cost effective for the digital good developer and/or the content producer, supportive of online distribution and multiple station licensing, traceable, difficult to undermine, and not overly burdensome on the consumer.

SUMMARY

The present invention provides DRM (Digital Rights Management) software, distribution methods, and arrangements that are designed to protect software, content (e.g., music, video, books, etc.), and other digital goods (hereinafter, "digital goods" refers to all the above). The DRM software is configured to be resistant to Break Once, Run Everywhere (BORE) attacks. The BORE-resistant methods and arrangements are easy and cost effective for the digital good developer or content producer to implement, and are not overly burdensome on the consumer. The various methods and arrangements support traditional and online distribution techniques, and are adaptable for site licensing. The resulting digital good is substantially difficult to undermine on any significant scale, because each copy is uniquely configured for use by an authorized consumer/computer.

Thus, for example, in accordance with certain aspects of the present invention, improved DRM security is provided by individualizing the digital good for each consumer using selective program flow manipulation techniques. The program-flow-manipulation techniques are combined with encryption and/or cryptography keying techniques or other unique/trusted identifying techniques to individualize the configuration of a digital good for each authorized consumer.

The digital good can be distributed in one or more parts that are selectively modified and/or otherwise provided to an authorized consumer having the applicable security keys and/or other unique/trusted identifier information needed to complete the configuration of an individualized and operatively unique modified digital good.

The modified digital good is unique for each consumer/computer, because the security keys and/or other unique/trusted identifiers are used as inputs during program flow manipulation within the source's/consumer's computer. Subsequent initialization/operation of the uniquely configured modified digital good can include verifying the presence of certain consumer/computer identifying data to further promote DRM protection. Consequently, the modified digital good and the distribution techniques are substantially less susceptible to BORE tampering.

By way of example, the above stated needs and others are met by a method that includes providing an initial digital good to at least one computer. The initial digital good is converted into a modified digital good using unique key data to selectively manipulate at least one flow control operation within the initial digital good, such that the modified digital good is operatively different in configuration, but substantially functionally equivalent to the initial digital good.

The unique key data can be based on at least one unique identifier data associated with a destination computer. For example, a source computer can cryptographically generate the unique key data based on the unique identifier data provided by the destination computer and a secret encryption key. The method can include selectively limiting operation of the modified digital good to computers that are properly associated with at least the unique identifier data and/or unique key data.

The method can also include dividing the initial digital good into at least a first portion and a second portion using the source computer. The first portion is provided to the destination computer via a first computer readable medium, and a modified second portion to the destination computer via a second computer readable medium. Thus, for example, the first computer readable medium may include a fixed computer readable medium, while the second computer readable medium may include a network communication. The first portion is manipulated or modified by the destination computer using a first key. Similarly, the source computer manipulates the second portion using a second key.

When the initial digital good has been split into first and second portions, then the modified digital good would therefore include a combination of the modified first portion and the modified second portion. Since these portions were operatively reconfigured using related keys/techniques, the modifications made to each portion can be selected to match the modifications in the other.

Another aspect that is described herein is an arrangement that includes an identifier configured to output unique identifier data associated with a computer, and a key generator that is coupled to receive the unique identifier data and generate at least one unique key data based on the received unique identifier data. The arrangement also includes at least one individualizer that is configured to receive the unique key data and at least a portion of an initial digital good, and output at least a portion of a modified digital good using the unique key data to selectively alter the initial digital good. Consequently, the modified digital good will be operatively different in configuration, but substantially functionally equivalent to the initial digital good.

DETAILED DESCRIPTION

Figure 1:
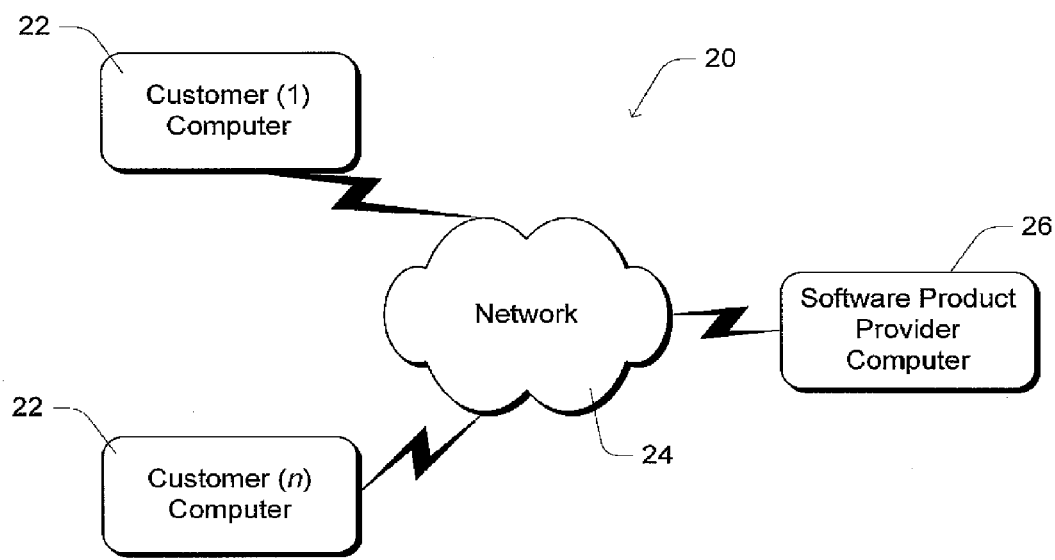
FIG. 1 is a block diagram depicting an exemplary network suitable for use with the present invention.

FIG. 1 is a block diagram depicting an exemplary computer network 20 that is suitable for use with the various methods and arrangements in accordance with the present invention.

Computer network 20 includes a plurality of host or customer computers 22 coupled to at least one communications network 24. Communication network 24 is further coupled to at least one source or digital good provider computer 26. Computers 22 and 26 are configured to communicate with each other over communications network 24. By way of example, communications network 24 can include a public network such as the Internet. Communications network 24 might also include local-area networks, private wide-area networks, direct dial-up links, and the like.

In the discussion below, certain aspects of the present invention will be described in the general context of computer-executable instructions, such as program modules, being executed by one or more conventional personal computers. Generally, program modules include routines, programs, program segments, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, mini-computers, mainframe computers, and the like. In a distributed computer environment, program modules may be located in both local and remote memory storage devices.

Figure 2:
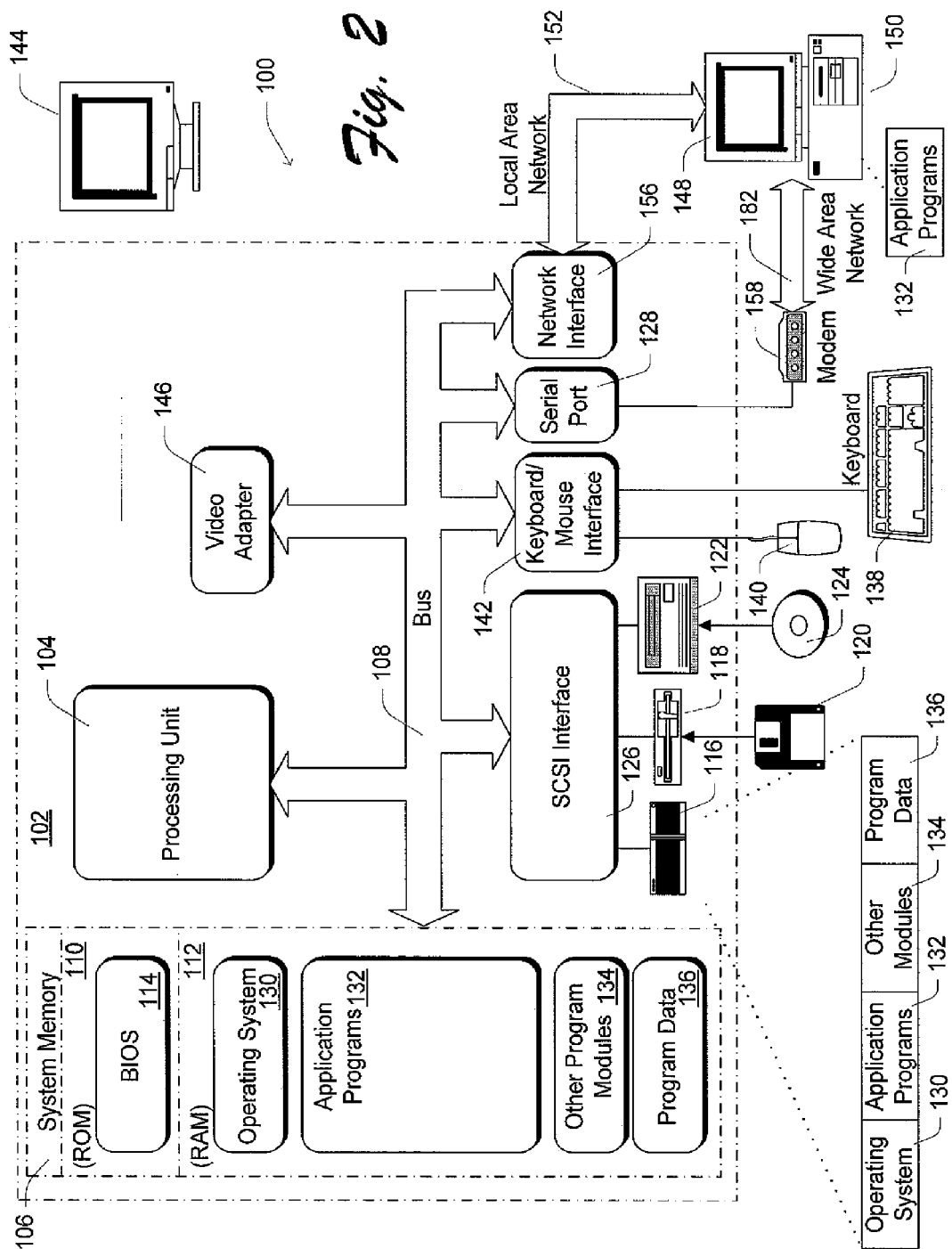
FIG. 2 is a block diagram depicting an exemplary computer system suitable for use in the network of FIG. 1.

FIG. 2 is a block diagram depicting a computer 102 that can be included in customer computer 22 and/or provider computer 26, for example. Computer 102 includes one or more processors or processing units 104, a system memory 106, and a bus 108 that couples various system components including the system memory 106 to processors 104.

Bus 108 represents one or more of any of several types of bus structures, including a memory bus or memory controller, a peripheral bus, an accelerated graphics port, and a processor or local bus using any of a variety of bus architectures. The system memory includes read only memory (ROM) 110 and random access memory (RAM) 112. A basic input/output system (BIOS) 114, containing the basic routines that help to transfer information between elements within computer 102, such as during start-up, is stored in ROM 110. Computer 102 further includes a hard disk drive 116 for reading from and writing to a hard disk, not shown, a magnetic disk drive 118 for reading from and writing to a removable magnetic disk 120, and an optical disk drive 122 for reading from or writing to a removable optical disk 124 such as a CD ROM, DVD ROM or other optical media. The hard disk drive 116, magnetic disk drive 118, and optical disk drive 122 are connected to the bus 108 by an SCSI interface 126 or some other appropriate interface. The drives and their associated computer-readable media provide non-volatile storage of computer readable instructions, data structures, program modules and other data for computer 102. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 120, optical disk 124, ROM 110, or RAM 112, including an operating system 130, one or more application programs 132, other program modules 134, and program data 136. A user may enter commands and information into computer 102 through input devices such as keyboard 138 and pointing device 140. Other input devices (not shown) may include a microphone, joystick, game pad, satellite dish, scanner, or the like. These and other input devices are connected to the processing unit 104 through an interface 142 that is coupled to the bus 108. A monitor 144 or other type of display device is also connected to the bus 108 via an interface, such as a video adapter 146. In addition to the monitor, personal computers typically include other peripheral output devices (not shown) such as speakers and printers.

Computer 102 can operate in a networked environment using logical connections to one or more remote computers, such as a remote computer 148. Remote computer 148 may be another personal computer, a server, a router, a network PC, a peer device or other common network node, and typically includes many or all of the elements described above relative to computer 102, although only a memory storage device 150 has been illustrated in FIG. 2. The logical connections depicted in FIG. 2 include a local area network (LAN) 152 and a wide area network (WAN) 154. Such networking environments are commonplace in offices, enterprise-wide computer networks, intranets, and the Internet.

When used in a LAN networking environment, computer 102 is connected to the local network 152 through a network interface or adapter 156. When used in a WAN networking environment, computer 102 typically includes a modem 158 or other means for establishing communications over the wide area network 154, such as the Internet. Modem 158, which may be internal or external, is connected to the bus 108 via a serial port interface 128. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, software programs and other executable program components such as the operating system are illustrated herein as discrete blocks, although it is recognized that such programs and components reside at various times in different storage components of the computer, and are executed by the data processor(s) of the computer.

Figure 3:
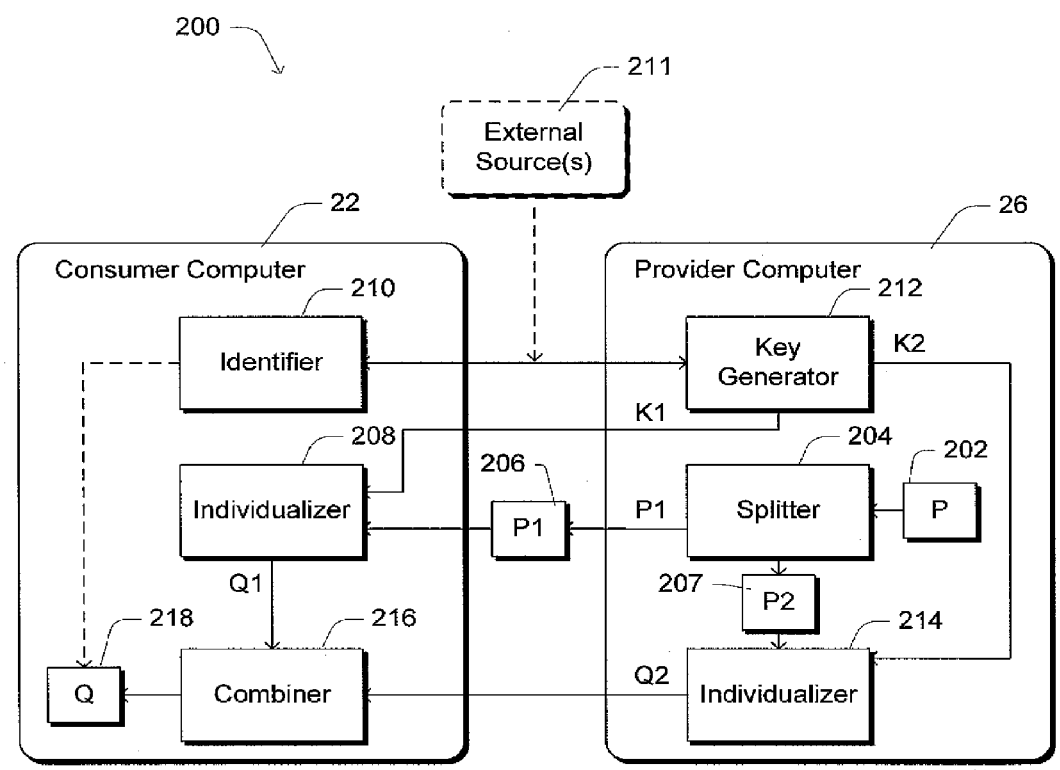
FIG. 3 is a block diagram depicting an exemplary BORE-resistant digital good configuration and distribution arrangement suitable for use within the network of FIG. 1, in accordance with certain aspects of the present invention.

Reference is now made to FIG. 3, which is a block diagram depicting an exemplary arrangement 200 that includes consumer computer 22 and provider computer 26 and is configured to distribute and/or otherwise provide digital goods to consumer computer 22 in a BORE-resistant manner. Here, a digital good "P" 202 is initially arranged within provider computer 26. Digital good P 202 can include one or more computer programs, applications, operating systems, various modules, functions, and/or content (e.g., music, video, books, etc.) and/or other types of digital data, for example. Provider computer 26 is tasked to provide digital good P 202 or an equivalent form thereof to consumer computer 22, such that the resulting digital good on consumer computer 22 will be significantly BORE resistant.

This is accomplished, in this example, by arranging provider computer 26 to deliver digital good P 202 in at least two stages. In a first stage, a first portion "P1" 206 of digital good P 202 is delivered to consumer computer 22, for example, via a CD ROM, DVD ROM, removable magnetic disk, preloaded on a hard disk drive, solid-state memory device, a network connection, other conventional computer readable media, or the like. In a second stage, a second portion "P2" 207 of digital good P 202 (e.g., P=P1+P2) is converted to a modified second portion "Q2" based on identifying information provided by consumer computer 22. The modified second portion Q2 is provided to consumer computer 22. While modified second portion Q2 can be provided to consumer computer 22 via any traditional/conventional computer readable medium, in this example, modified second portion Q2 is provided to consumer computer 22 via a network connection that allows for timely delivery.

Consumer computer 22, having received first portion P1 206, converts first portion P1 206 to a modified first portion "Q1" using information provided by provider computer 26. Consumer computer 22 is then able to combine modified first portion Q1 with modified portion Q2 to produce a uniquely configured modified digital good "Q" 218 (e.g., Q=Q1+Q2) that is functionally equivalent to digital good P 202.

With this basic process in mind, referring to FIG. 3, in this exemplary arrangement digital good P 202 is split or otherwise divided into at least two portions, e.g., P1 and P2, by a splitter 204. First portion P1 206 is provided to an individualizer 208 within consumer computer 22. Second portion P2 207 is provided to an individualizer 214 within provider computer 26. By way of example, individualizers 208 and 214 may include a program flow manipulator or other like mechanism that allows the respective portions of digital good P 202 to be operatively, functionally, sequentially, associatively, or otherwise individualized based at least in part on one or more inputs. Here, for example, keys K1 and K2 are generated and/or otherwise provided to their respective individualizers 208 and 214 and used to "individualize" portions P1 and P2, respectively.

An identifier 210 within consumer computer 22, which may be implemented in hardware and/or software, is essentially configured to uniquely identify consumer computer 22 in some manner. By way of example, identifier 210 can include circuitry and/or functions that output unique identifying data associated with processing unit 104, operating system 130, application programs 132, other modules 134, program data 136, other resources/subsystems within computer 102, or coupled therewith. Identifier 210 may include information associated with the consumer. For example, client identifier 210 might include name, address, telephone, credit card, and/or other similar data. This and other identifying information may be provided by one or more (optional) external sources 211 to identifier 210 and/or provider computer 26. For example, external sources 211 may include one or more computers, databases, human operators, etc., which provide the requisite identifying information to arrangement 200.

As shown, in this example the data output from client identifier 210 and/or (optional) external sources 211 is provided to a key generator 212 within provider computer 26. Key generator 212 is configured to generate one or more cryptographically related encryption keys based at least in part on the identifying information/data from client identifier 210 and/or external sources 211. Here, key generator 212 generates two keys K1 and K2, which are cryptographically related to a secret key K and at least a portion of the data from client identifier 210. Consequently, keys K1 and K2 include data that is uniquely associated with consumer computer 22 and/or the consumer associated therewith. Conventional data encryption techniques are employed to insure that keys K1 and K2 cannot be easily determined without access to secret key K. Once generated, key K1 is provided to individualizer 208 within consumer computer 22, and key K2 is provided to individualizer 214 within provider computer 26.

Individualizer 208, having received key K1, selectively individualizes first portion P1 based on key K1. When a program flow manipulator is employed, for example, this can include rearranging at least one program section, block of code, pointer, address, adding/deleting code, etc., as definable within a program flow-graph associated with first portion P1. Preferably, several modifications occur within individualizer 208 to cause the resulting modified first portion Q1 to be uniquely associated with key K1 and distinctly different from first portion P1 206. Data from key K1 may be included within modified portion Q1. Modified first portion Q1 is then provided to a combiner 216.

Similarly, individualizer 214, having received key K2, selectively individualizes second portion P2 based on key K2. Again, when a program flow manipulator is employed, for example this can include rearranging at least one program section, block of code, pointer, address, adding/deleting code, etc., as definable within a program flow-graph associated with second portion P2. Preferably, several modifications occur within individualizer 214 to cause the resulting modified second portion Q2 to be uniquely associated with key K2. Modified second portion Q2 is then provided to combiner 216 within consumer computer 22.

Combiner 216 is configured to combine modified first portion Q1 and modified second portion Q2 to produce a modified digital good Q 218. Modified digital good Q 218 is operatively configured to run within consumer computer 22. Modified digital good Q 218 can be further configured to verify that information from client identifier 210 matches related information, for example, data associated with key K1, as incorporated in modified digital good Q 218. Thus, modified digital good Q 218 can be designed to verify that the host computer that it is running on, or attempting to be run on, is indeed authorized to do so.

In this manner, arrangement 200 causes the resulting configuration of modified digital good Q 218 to be substantially unique for each particular computer and/or consumer. Arrangement 200 is significantly BORE resistant, since the security features of each unique implementation of modified digital good Q 218 are inherently unique and would require potential hackers to expend a great deal of effort to discover, override and/or otherwise disable the features. Thus, rather than posing a "break once" situation, the present invention would require hackers to "break each" modified digital good Q 218.

Additional security features can also be included or otherwise incorporated in modified digital good Q 218, such as, for example, various encryption, data hiding and/or fingerprinting techniques can be employed to further discourage unauthorized use or distribution. Thus, with respect to FIG. 3, for example, digital 11 good P 202 can be further pre-processed prior to being provided to splitter 204. Portions P1 206 and/or P2 207 can be further post-processed prior to being supplied to individualizers 208 and 214, respectively. Similarly, additional pre/post-processing can be conducted on modified first portions Q1 and/or Q2. Such security features may include local data such as, for example, time and date, serial numbers, random numbers, other public/private keys, digital certificates, digital signatures, etc. In certain configurations, provider computer 26 may also store certain types of information in a local database (not shown).

Those skilled in the art will recognize that the processing described above can be selectively distributed and/or scheduled as needed. Indeed, in certain arrangements, processes that are computationally intensive may be completed offline or on other computers (not shown). Thus, for example, if individualizer 208 includes a program flow manipulator, it may be prudent to run the program flow manipulator on another computer rather than tie up consumer computer 22.

In other arrangements, splitter 204 may also be provided through one or more other computers.

In accordance with certain further aspects, arrangement 200 of FIG. 3 can even be employed when either first portion P1 206 or second portion P2 207 contains no data (i.e., P1=P, or P2=P).

Figure 4:
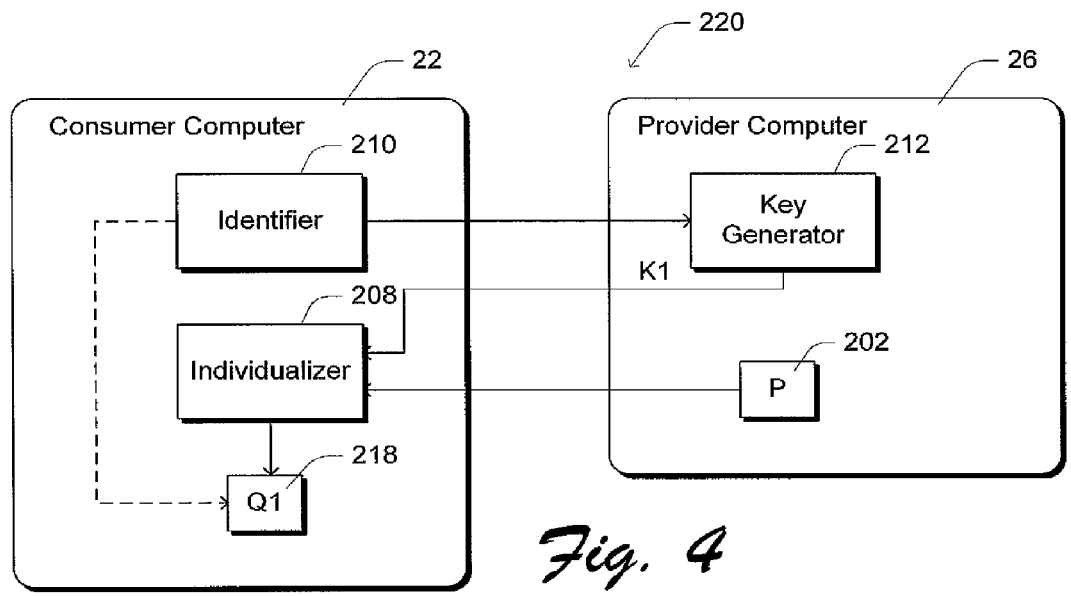
FIG. 4 is a block diagram depicting another exemplary BORE-resistant digital good configuration and distribution arrangement suitable for use within the network of FIG. 1, in accordance with certain further aspects of the present invention.
Figure 5:
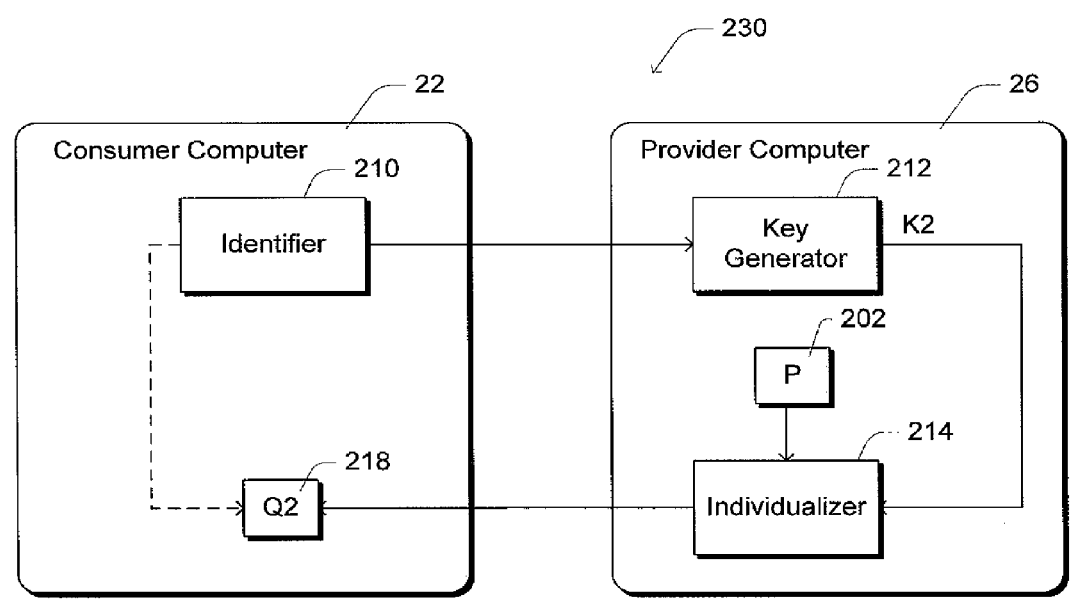
FIG. 5 is a block diagram depicting yet another exemplary BORE-resistant digital good configuration and distribution arrangement suitable for use within the network of FIG. 1, in accordance with certain additional aspects of the present invention.

Exemplary implementations in such cases are depicted in FIGS. 4 and 5, as described below. Basically, if either first portion P1 206 or second portion P2 207 contains no data, then certain functionality within arrangement 200 of FIG. 3 can be eliminated or otherwise ignored.

FIG. 4 is a block diagram depicting another exemplary arrangement 220, in accordance with certain further aspects of the present invention. As shown, in this example, digital good P 202 is not split into portions. Instead, digital good P 202 is provided to individualizer 208. Key generator 212 is configured to generate key K1 based on data from identifier 210. Key K1 is then provided to individualizer 208. Individualizer 208 converts digital good P 202 into modified digital good Q1 218.

FIG. 5 is a block diagram depicting yet another exemplary arrangement 230. As shown, in this example, digital good P 202 is not split into portions. Instead, digital good P 202 is provided to individualizer 214. Key generator 212 generates key K2 based on data from identifier 210. Key K2 is provided to individualizer 214. Individualizer 214 then converts digital good P 202 into a modified digital good Q2 218. Modified digital good Q2 218 is then provided to consumer computer 22.

Figure 6:
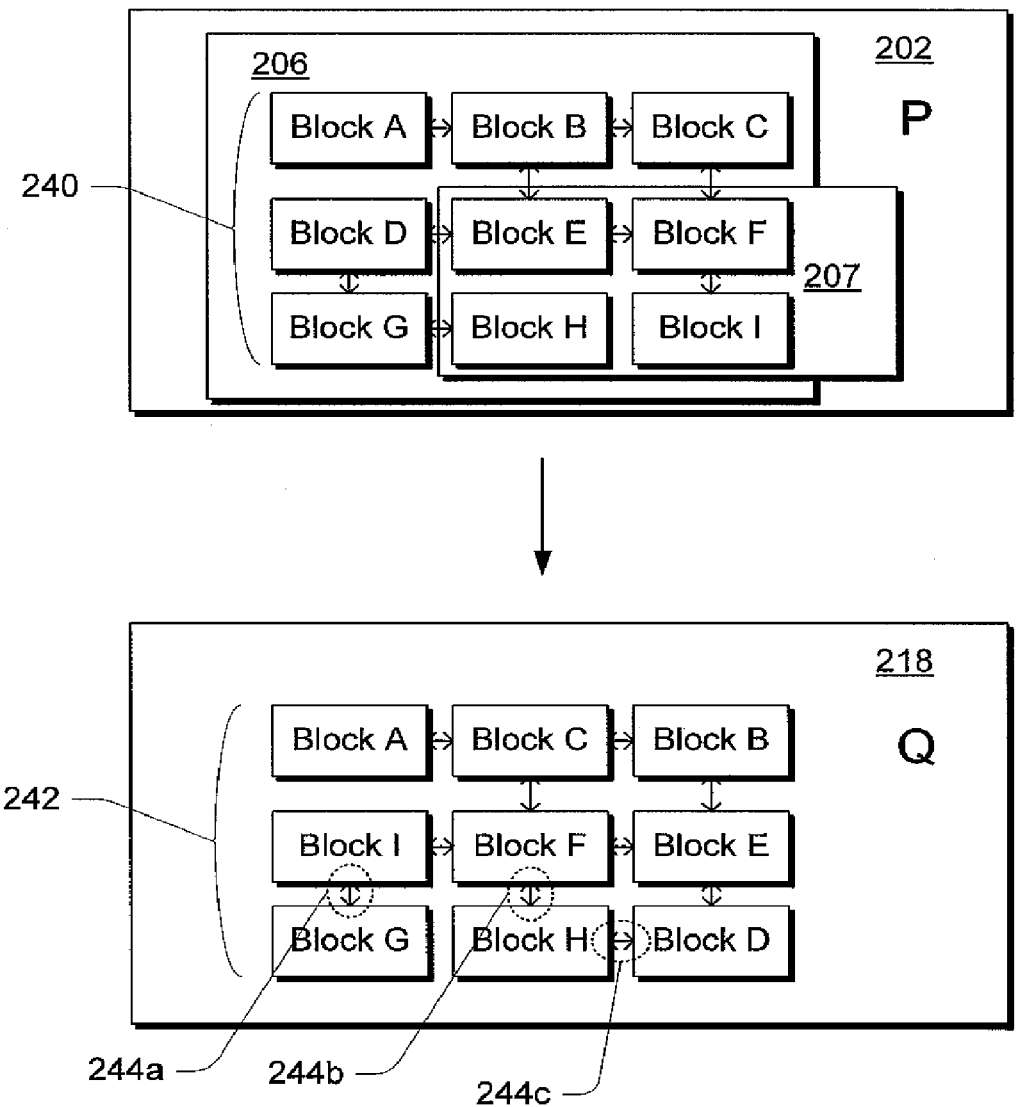
FIG. 6 is a block diagram that illustratively depicts certain exemplary features of a BORE-resistant digital good as configured and distributed, for example, by the arrangement in FIG. 3.

FIG. 6 is a block diagram that illustratively depicts certain exemplary features of a BORE-resistant digital good as configured and distributed, for example, by arrangement 200 in FIG. 3, as described above. In this example, digital good P 202 includes a plurality of segments or blocks 240 that are operatively or associatively configured together in some manner, for example, as represented by the interconnecting arrows between various blocks. Thus, for example, the arrow between "block A" and "block B" can represent a calling function, a pointer, data passing, a content sequence, a content ordering, or the like.

As shown, digital good P 202 has been selectively split into a first portion P1 206 and second portion P2 207. Here, first portion P1 206 includes "block A", "block B", "block C", "block D", and "block G". Second portion P2 207 includes "block E", "block F", "block H", and "block I".

As a result of arrangement 200, in FIG. 3, for example, a modified digital good Q 218 has been created as shown at the bottom of FIG. 6. Here, the blocks 240 have been rearranged as blocks 242, and operatively or associatively reconfigured as represented, for example, by arrows 244a-c. This produces a functionally equivalent version of digital good P 202. Thus, for example, arrow 244a illustrates that "block I" and "block G" are now operatively or associatively coupled, arrow 244b illustrates that "block F" and "block H" are now operatively or associatively coupled, and arrow 244c illustrates that "block H" and "block D" are now operatively or associatively coupled, where they were not previously. Similarly, the absence of an arrow between "block A" and "block B" represents that they are no longer directly operatively or associatively coupled as before, but rather "block C" has been introduced there between.

Those skilled in the art will recognize that a variety of different permutations are available in configuring digital good P 202 into corresponding modified digital good Q 218, and that certain configurations will be more optimal than others. For this reason and others, splitter 204, individualizers 208 and 214, and/or combiner 216 can be further arranged to configure digital good Q 218 to meet certain performance goals, as well as DRM goals.

Figure 7:
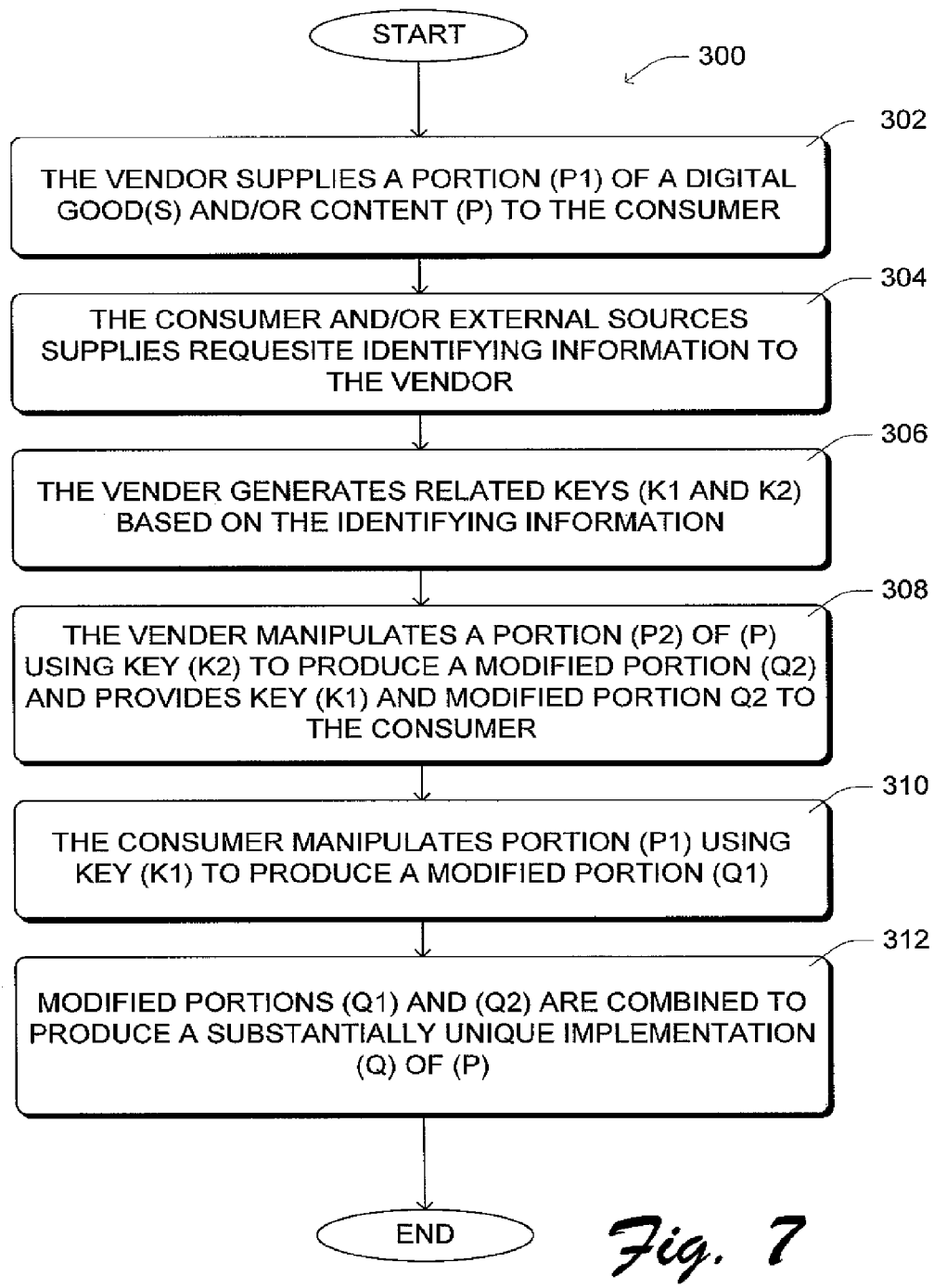
FIG. 7 is a flow-chart depicting an exemplary process for providing a BORE-resistant digital good to the computer system of FIG. 2.

FIG. 7 is a flow-chart depicting an exemplary process 300 for providing a BORE-resistant digital good to a computer 102, as in FIG. 2, for example, using arrangement 200. In step 302, the digital good provider (e.g., a vendor) supplies a first portion P1 206 of a digital good P 202 to a consumer. In step 304, the consumer supplies requisite identifying information to the vendor. In step 304, the vendor may also or optionally access identifying information within additional external resources. Next, in step 306, the vendor generates cryptographically related keys K1 and K2 based at least in part on the identifying information in step 304.

In step 308, the vendor individualizes at least part of a second portion P2 of digital good P 202, using key K2. This results in a modified second portion Q2. The vendor provides modified second portion Q2 and key K1 to the consumer.

In step 310, the consumer individualizes first portion P1 206 using key K1, which results in a modified portion Q1. Next, in step 312, the consumer combines modified first portion Q1 and modified second portion Q2 to produce a modified digital good Q 218, which a uniquely and operatively associated with the consumer and substantially functionally equivalent to digital good P 202.

Figure 8:
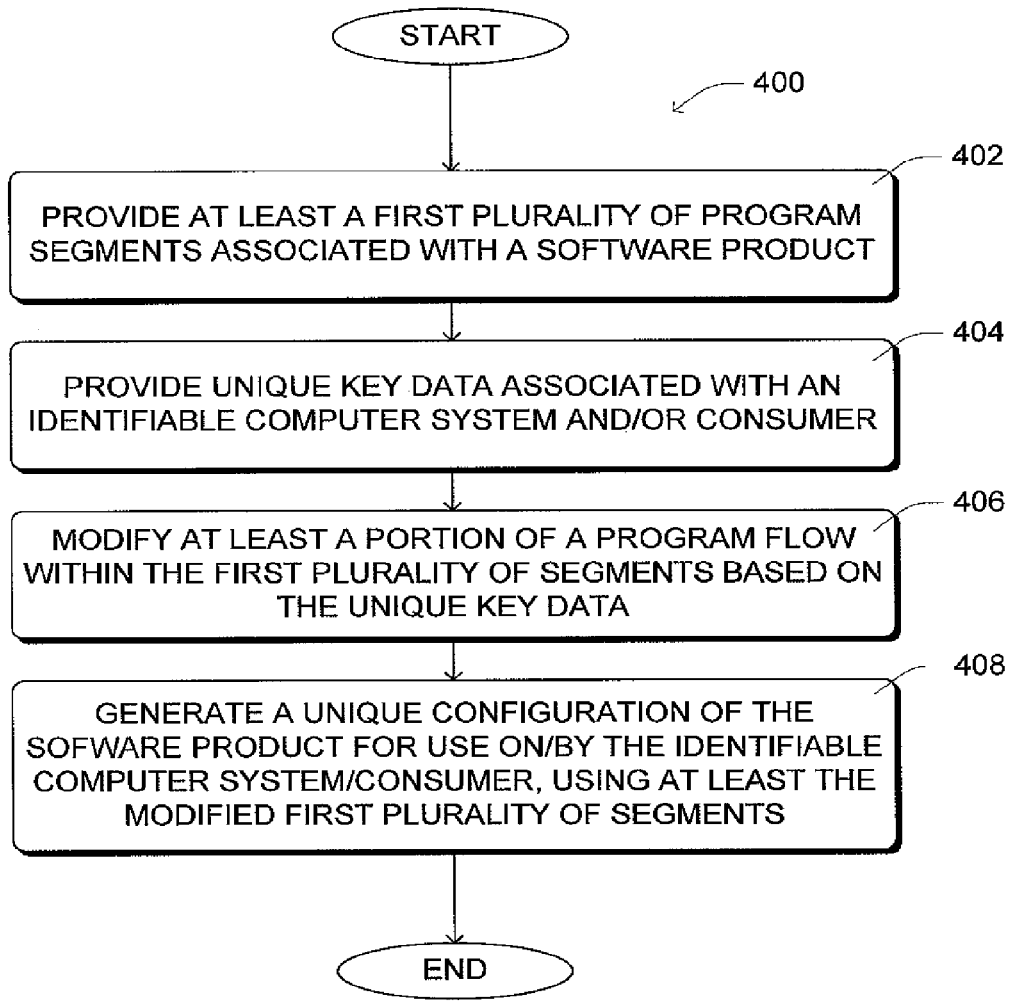
FIG. 8 is a flow-chart depicting an exemplary process for configuring a BORE-resistant digital good using the computer system of FIG. 2.

FIG. 8 is a flow-chart depicting an exemplary process 400 for configuring a digital good using the BORE-resistant techniques as described above. In this example, the digital good is assumed to be a software program. In step 402, a first plurality of program segments associated with digital good P 202 are provided. In step 404, unique key data associated with an identifiable computer/consumer is provided. Next, as shown in step 406, at least a portion of a program flow within the first plurality of segments is modified based on the unique key data. In step 408, a unique digital good is provided for use by the identifiable computer/consumer, using at least the modified first plurality of segments from step 406.

Figure 9:
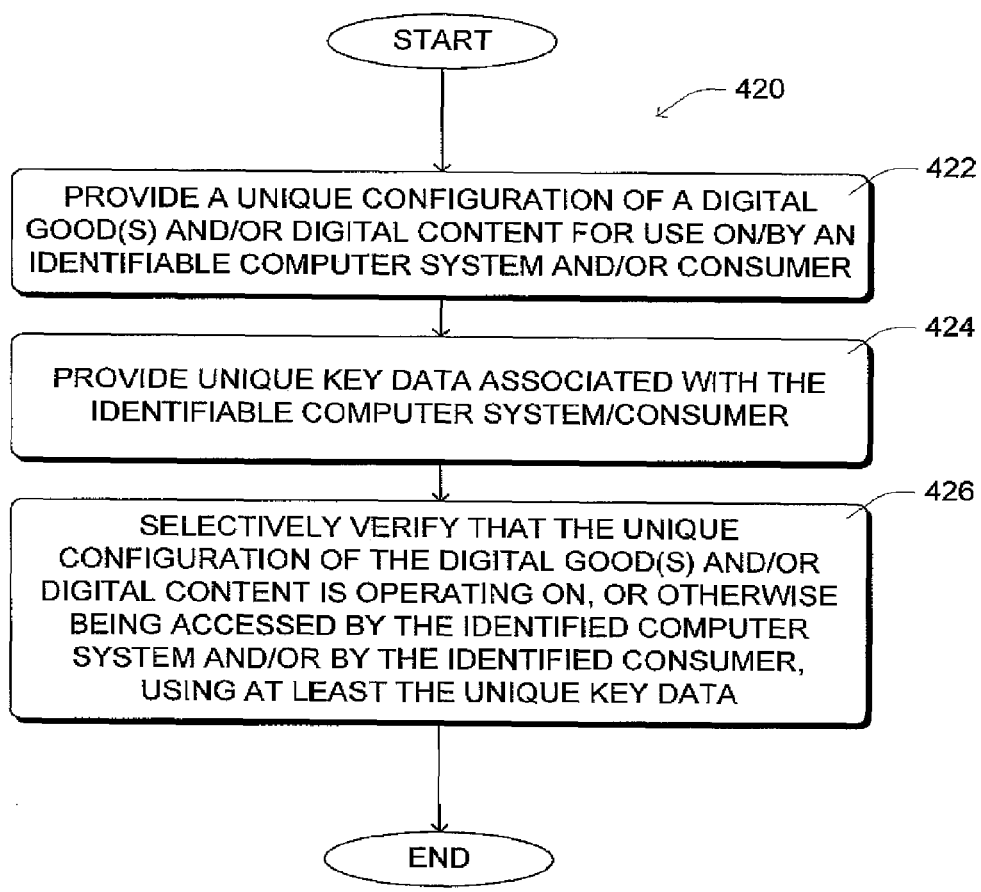
FIG. 9 is a flow-chart depicting an exemplary process for operating the computer system of FIG. 2 using a BORE-resistant digital good.

FIG. 9 is a flow-chart depicting an exemplary process 420 for operating a computer 102, as in FIG. 2, for example, using a BORE-resistant digital good that has been configured using the BORE-resistant techniques as described above. Here, in step 422, a uniquely configured digital good is provided for use by an identifiable computer/consumer. In step 424, unique key data associated with the identifiable computer/consumer is also provided. Next, in step 426, the uniquely configured digital good is selectively verified, using the unique key data, as being properly associated with an identifiable computer/consumer running or attempting to run the unique configuration digital good. The uniquely configured digital good will be unable to properly/fully function, or to be otherwise fully accessed, if the identifiable computer/consumer cannot be properly verified in step 426.

The preceding exemplary methods and arrangements may be implemented in an automated and controlled manner, such that neither the consumer nor the digital good provider is overly burdened.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:
    providing an initial digital good to at least one computer, wherein the initial digital good includes a plurality of selectively arranged parts in an initial configuration and the initial digital good is configured as to not properly function with the computer;
    with the at least one computer:
        receiving unique key data;
        converting the initial digital good into a modified digital good using the unique key data to selectively individualize the initial digital good for use with the computer, such that the plurality of selectively arranged parts in the modified digital good have been rearranged to have a substantially unique operative configuration that properly functions with the computer and is different than the initial configuration; and
        causing the at least one computer to run the modified digital good.

2. A method as recited in claim 1, wherein converting the initial digital good into the modified digital good further includes manipulating at least one flow control operation within the initial digital good.

3. A method as recited in claim 1, further comprising:
    causing at least one other computer to generate the unique key data based on at least one unique identifier data associated with the at least one computer.

4. A method as recited in claim 3, further comprising:
    selectively limiting operation of the modified digital good to computers that are properly associated with at least the unique identifier data.

5. A method as recited in claim 3, wherein causing the at least one other computer to generate the unique key data further includes:
    causing the at least one computer to provide the unique identifier data associated with the at least one computer to the at least one other computer; and causing the at least one other computer to cryptographically generate the unique key data based on the unique identifier data provided by the at least one computer and at least one secret key.

6. A method as recited in claim 5, wherein the at least one other computer generates at least a first key and a second key, and the first key and the second key are different, but cryptographically related to the secret key, and wherein the received unique key data includes the first key.

7. A method as recited in claim 1, wherein providing an initial digital good to the at least one computer further includes:
dividing the initial digital good into at least a first portion and a second portion using at least one other computer;
providing the first portion to the at least one computer via a first computer readable medium; and
subsequently providing the second portion to the at least one computer via a second computer readable medium.

8. A method as recited in claim 7, wherein the first computer readable medium includes a different type of computer readable medium than the second computer readable medium.

9. A method as recited in claim 8, wherein the first computer readable medium includes a fixed computer readable medium and the second computer readable medium includes a network communication.

10. A method as recited in claim 7, wherein providing the second portion to the at least one computer further includes:
converting the second portion into a modified second portion using the unique key data to selectively manipulate at least one flow control operation within the second portion, such that the modified second portion is operatively different in configuration to the second portion; and
providing the modified second portion to the at least one computer via the second computer readable medium, in place of the second portion.

11. A method as recited in claim 10, wherein the at least one other computer is used to convert the second portion into the modified second portion.

12. A method as recited in claim 10, wherein the unique key data includes at least a first key and a second key, and converting the second portion into a modified second portion further includes using the second key to selectively manipulate at least one flow control operation within the second portion.

13. A method as recited in claim 10, wherein the unique key data includes at least a first key and a second key, and providing the second portion to the at least one computer further includes providing the first key to the at least one computer.

14. A method as recited in claim 13, wherein converting the initial digital good into a modified digital good further includes
with the at least one computer, converting the first portion into a modified first portion using the first key to selectively manipulate at least one flow control operation within the first portion, such that the modified first portion is operatively different in configuration; and
causing the at least one computer to operatively combine the modified first portion and the modified second portion to produce the modified digital good.

15. A method as recited in claim 13, further comprising:
selectively limiting operation of the modified digital good to computers that are properly associated with at least the first key.

16. A method as recited in claim 3, further comprising:
causing the at least one computer to provide the unique identifier data associated with the at least one computer to the at least one other computer; and
accessing computer identification data within the at least one computer and including the computer identification data within the unique identifier data associated with the at least one computer.

17. A method as recited in claim 16, wherein causing the at least one computer to provide the unique identifier data associated with the at least one computer to the at least one other computer further includes:
receiving user identification data at the at least one computer and including the user identification data within the unique identifier data associated with the at least one computer.

18. A computer-readable medium comprising computer-executable instructions for:
with the at least one computer;
receiving an initial digital good, wherein the initial digital good includes a plurality of selectively arranged parts in an initial configuration and the initial digital good is configured as to not properly function with the computer;
receiving unique key data; and
converting the initial digital good into a modified digital good using the unique key data to selectively individualize the initial digital good for use with the at least one computer, such that the plurality of selectively arranged parts in the modified digital good are rearranged to have a substantially unique operative configuration that properly functions with the at least one computer and is different than the initial configuration.

19. A computer-readable medium as recited in claim 18, wherein converting the initial digital good into the modified digital good further includes manipulating at least one flow control operation within the initial digital good.

20. A computer-readable medium as recited in claim 18, comprising further computer-executable instructions for:
subsequently determining if the at least one computer is properly associated with at least the unique identifier data; and
disabling operation of the modified digital good if the at least one computer that is not properly associated with the unique identifier data.

21. A computer-readable medium as recited in claim 18, comprising further computer-executable instructions for:
causing the at least one computer to provide unique identifier data associated with the at least one computer to at least one other computer that is configurable to cryptographically generate the unique key data based on the unique identifier data and at least one secret key.

22. A computer-readable medium as recited in claim 18, wherein:
receiving the initial digital good further includes receiving a first portion of the digital good via a first type of computer readable medium and a modified second portion of the digital good via a second computer readable medium; and
converting the initial digital good into a modified digital good further includes converting the first portion using the unique key data to selectively manipulate at least one flow control operation within the first portion, to produce a modified first portion that is operatively different in configuration, and then operatively combining the modified first portion and the modified second portion to produce the modified digital good.

23. A computer-readable medium as recited in claim 22, wherein the first computer readable medium includes a different type of computer readable medium than the second computer readable medium.

24. A computer-readable medium as recited in claim 23, wherein the first computer readable medium includes a fixed computer readable medium and the second computer readable medium includes a network communication.

25. A computer-readable medium as recited in claim 20, wherein causing the at least one computer to provide unique identifier data further includes:
 accessing computer identification data within the at least one computer and including the computer identification data within the unique identifier data associated with the at least one computer.

26. A computer-readable medium as recited in claim 20, wherein causing the at least one computer to provide unique identifier data further includes:
 receiving user identification data and including the user identification data within the unique identifier data associated with the at least one computer.

27. A computer-readable medium comprising computer-executable instructions for:
 receiving unique identifier data associated with at least one computer;
 generating unique key data based on at least the unique identifier data;
 receiving at least a portion of an initial digital good having a plurality of selectively arranged parts in an initial configuration;
 converting the at least a portion using the unique key data to selectively individualize the portion, such that a modified portion of the digital good is produced having the plurality of parts rearranged in a different configuration than the initial configuration; and
 providing at least the modified portion of the digital good and at least a portion of the unique key data to the at least one computer.

28. A computer-readable medium as recited in claim 27, wherein converting at least the portion of the initial digital good using the unique key data to selectively individualize the portion of the initial digital good further includes manipulating at least one flow control operation within the portion of the initial digital good.

29. A computer-readable medium as recited in claim 27, wherein generating the unique key data further includes:
 cryptographically generating the unique key data based on the unique identifier data provided by the at least one computer and at least one secret key.

30. A computer-readable medium as recited in claim 29, wherein the unique key data includes at least a first key and a second key, and the first key and the second key are different, but cryptographically related to the secret key.

31. A computer-readable medium as recited in claim 29, wherein converting at least portion of the initial digital good using the unique key data further includes:
 dividing the initial digital good into at least a first portion and a second portion;
 providing the first portion to the at least one computer via a first computer readable medium;
 converting the second portion using the second key to selectively manipulate at least one flow control operation within the second portion, such that a modified second portion is produced that is operatively different in configuration; and
 providing the modified second portion and the first key to the at least one computer via a second computer readable medium.

32. A computer-readable medium as recited in claim 31, wherein the first computer readable medium includes a different type of computer readable medium than the second computer readable medium.

33. A computer-readable medium as recited in claim 32, wherein the first computer readable medium includes a fixed computer readable medium and the second computer readable medium includes a network communication.

34. An apparatus for use in a host computer, the apparatus comprising:
 an individualizer configured to receive unique key data and at least a portion of an initial digital good that includes a plurality of selectively arranged parts in an initial configuration, and produce at least a portion of a modified digital good using the unique key data to selectively individualize the initial digital good for use with the host computer, and such that the plurality of selectively arranged parts in the modified digital good are rearranged to be operatively different in configuration than the initial configuration of the digital good.

35. An apparatus as recited in claim 34, wherein the individualizer is further configured to selectively individualize the initial digital good by selectively manipulating at least one program flow control operation within the initial digital good.

36. An apparatus as recited in claim 34, wherein the unique key data is cryptographically related to unique identifier data associated with the host computer.

37. An apparatus as recited in claim 36, further comprising:
 an identifier configured to output the unique identifier data associated with the host computer to the source computer.

38. An apparatus as recited in claim 34, further comprising:
 a program combiner configured to receive a modified first portion of the digital good from the individualizer and a modified second portion from the source computer, and output the modified digital good by combining the modified first portion with the modified second portion.

39. An apparatus as recited in claim 34, wherein the modified digital good is operatively configured to selectively verify that the host computer is properly associated with the unique identifier data output by the identifier.

40. An apparatus as recited in claim 34, wherein the modified digital good is operatively configured to selectively verify that the host computer is properly associated with the unique key data.

41. An apparatus as recited in claim 37, wherein the identifier is further configured to access computer identification data within the host computer and include the computer identification data within the unique identifier data associated with the host computer.

42. An apparatus as recited in claim 37, wherein the identifier is further configured to receive user identification data at the host computer and include the user identification data within the unique identifier data associated with the host computer.

43. An apparatus for use in a source computer, the apparatus comprising:
 a key generator configured to receive a unique identifier data from a destination computer and generate unique key data based on the received unique identifier data associated with the destination computer; and an individualizer configured to receive the unique key data and at least a portion of an initial digital good having a plurality of selectively arranged parts in an initial configuration and output at least a portion of a modified digital good using the unique key data to selectively individualize the initial digital good, such that in the modified digital good the plurality of selectively arranged parts have been rearranged to have an operatively different configuration than the initial configuration.

44. An apparatus as recited in claim 43, wherein the individualizer is further configured to selectively individualize the initial digital good by manipulating at least one program flow control operation within the initial digital good.

45. An apparatus as recited in claim 43, further comprising:
a splitter configured to divide the initial digital good into at least a first portion and a second portion, provide the first portion to the individualizer, and provide the second portion to the destination computer.

46. An apparatus as recited in claim 45, wherein the key generator is further configured to cryptographically generate the unique key data based on the unique identifier data and at least one secret key, the unique key data includes at least a first key and a second key which are unique, but cryptographically related to the secret key, and wherein the key generator is configured to provide the first key is to the individualizer, and the second key to the destination computer.

47. An apparatus as recited in claim 46, wherein the individualizer is further configured to use the second key to selectively individualize the second portion, such that a resulting modified second portion is operatively different in configuration from the second portion.

48. An apparatus as recited in claim 45, wherein the splitter is further configured to allow the first portion to be provided to the destination computer via a first computer readable medium, and to provide the modified second portion to the destination computer via a second computer readable medium that is a different type of computer readable medium than the first computer readable medium.

49. An apparatus as recited in claim 48, wherein the first computer readable medium includes a fixed computer readable medium and the second computer readable medium includes a network communication.

50. A system comprising:
an identifier configured to output unique identifier data associated with a computer;
a key generator coupled to receive the unique identifier data and generate at least one unique key data based on the received unique identifier data; and
at least one individualizer configured to receive the unique key data and at least a portion of an initial digital good that includes a plurality of selectively arranged parts in an initial configuration, and output at least a portion of a modified digital good using the unique key data to selectively individualize the initial digital good, such that the plurality of selectively arranged parts in the modified digital good have been rearranged to be operatively different in configuration than the initial configuration of the digital good.

51. A system as recited in claim 50, wherein the individualizer is further configured to selectively individualize the initial digital good by manipulating at least one program flow control operation within the initial digital good.

52. A system as recited in claim 50, further comprising:
at least one source computer; and
at least one destination computer coupled to the source computer.

53. A system as recited in claim 52, wherein the identifier is provided within the destination computer and is configured to output unique identifier data associated with the destination computer to the source computer, and the key generator and individualizer are each provided within the source computer.

54. A system as recited in claim 52, wherein the identifier is provided within the destination computer and is configured to output unique identifier data associated with the destination computer to the source computer, the key generator is provided within the source computer, and the individualizer is provided within the destination computer.

55. A system as recited in claim 52, wherein the identifier is provided within the destination computer and is configured to output unique identifier data associated with the destination computer to the source computer, the key generator is provided within the source computer, a first individualizer is provided within the destination computer, and a second individualizer is provided within the source computer.

56. A system as recited in claim 55, further comprising:
a splitter provided within the source computer and configured to divide the initial digital good into at least a first portion and a second portion, provide the first portion to the first individualizer, and provide the second portion to the second individualizer.

57. A system as recited in claim 56, wherein the key generator is further configured to cryptographically generate the unique key data based on the unique identifier data and at least one secret key, the unique key data includes at least a first key and a second key which are unique, but cryptographically related to the secret key, the first key is provided to the first individualizer, and the second key is provided to the second individualizer.

58. A system as recited in claim 57, wherein the first individualizer is further configured to use the first key to selectively individualize the first portion, such that the resulting modified first portion is operatively different in configuration from the first portion.

59. A system as recited in claim 58, wherein the second individualizer is further configured to use the second key to selectively individualize the second portion, such that the resulting modified second portion is operatively different in configuration from the second portion.

60. A system as recited in claim 59, further comprising:
a combiner provided within the destination computer and configured to receive the modified first portion from the first individualizer and the modified second portion from the second individualizer, and output the modified digital good by combining the modified first portion with the modified second portion.

61. A system as recited in claim 50, wherein the modified digital good is operatively configured to selectively verify that the destination computer is properly associated with the unique identifier data output by the identifier.

62. A system as recited in claim 50, wherein the modified digital good is operatively configured to selectively verify that the destination computer is properly associated with the first key as provided by the key generator.

63. A system as recited in claim 56, wherein the first portion is provided to the destination computer via a first computer readable medium, the modified second portion is provided to the destination computer via a second computer readable medium that is a different type of computer readable medium than the first computer readable medium.

64. A system as recited in claim 63, wherein the first computer readable medium includes a fixed computer readable medium and the second computer readable medium includes a network communication.

65. A system as recited in claim 50, wherein the identifier is further configured to access computer identification data within a destination computer and includes the computer identification data within the unique identifier data associated with the destination computer.

66. A system as recited in claim 65, wherein the identifier is further configured to receive user identification data at a destination computer and include the user identification data within the unique identifier data associated with the destination computer.

* * * * *